United States Patent
Son

[11] Patent Number: 5,878,114
[45] Date of Patent: Mar. 2, 1999

[54] ELECTRONIC SWITCHING SYSTEM CAPABLE OF ANALYZING CHARGE DATA AUTOMATICALLY

[75] Inventor: Ki-Suk Son, Incheon, Rep. of Korea

[73] Assignee: Daewoo Telecom Ltd., Incheon, Rep. of Korea

[21] Appl. No.: 839,820

[22] Filed: Apr. 18, 1997

[30] Foreign Application Priority Data

Apr. 19, 1996 [KR] Rep. of Korea ............. 96-11981

[51] Int. Cl.⁶ ................. H04M 1/24; H04M 3/08; H04M 15/00
[52] U.S. Cl. ................. 379/13; 379/34; 379/112; 379/114; 379/14
[58] Field of Search ............. 379/1, 9, 10, 13, 379/14, 15, 32, 34, 35, 111, 112, 114, 115, 119, 120, 121, 127

[56] References Cited

U.S. PATENT DOCUMENTS 5,369,680 11/1994 Borbas et al. ............. 379/13
5,539,802 7/1996 De Caluwe et al. ............. 379/14
5,729,588 3/1998 Chin et al. ............. 379/14

*Primary Examiner*—Paul Loomis
*Attorney, Agent, or Firm*—Pennie & Edmonds LLP

[57] ABSTRACT

An electronic switching system (ESS) analyzes charge data automatically. The ESS comprises a generator for generating the charge data for a call; a recorder coupled with the generator for receiving the charge data from the generator and assembling a data block having a block header, a plurality of charge data and checksum value; a first memory for storing a multiplicity of the data blocks; an analyzer coupled with the first memory for checking the charge data of the data block to detect any erroneous charge data and search for a long call; a controller coupled with the analyzer for generating and transmitting a predetermined message for erroneous charge data to an operator and determining to verify the charge data for a subscriber of the long call; a verifier coupled with the generator for receiving from the generator and displaying the charge data; and a second memory coupled with the verifier for storing the verified charge data.

9 Claims, 3 Drawing Sheets

ELECTRONIC SWITCHING SYSTEM CAPABLE OF ANALYZING CHARGE DATA AUTOMATICALLY

FIELD OF THE INVENTION

The present invention relates to an electronic switching system; and, more particularly, to a system and a method capable of analyzing charge data automatically.

BACKGROUND OF THE INVENTION

As is well known in the art, an electronic switching system (ESS) selectively connects two assigned subscribers so as to establish a communication line therebetween.

As shown in FIG. 1, the ESS 1 comprises a multiplicity of switching subsystems (SS's) 10 and an administration subsystem (AS) 20. In FIG. 1, for the sake of simplicity, it is provided only one SS 10 in the ESS 1. The SS 10 includes a call handling unit (CHU) 120 and a charge data generating unit (CGU) 110 to communicate information between two selected subscribers and generate charge data. The AS 20 coupled with the SS 10 controls all the operations and maintenance functions of the ESS 1, such as administering the charge data and the like. The AS 20 includes a charge data recording unit (CRU) 130, a disk unit (DKU) 140, a magnetic tape unit (MTU) 150, a charge data verifying unit (CVU) 160, and a verification database (VDB) 170.

When a call is terminated, predetermined details of the call, such as a type of call (e.g., long distance call), a type of subscriber (e.g., ISDN subscriber), a charge class (e.g., source charging), a source number, a destination number, a calling start time and a calling end time, are transferred from the CHU 120 to the CGU 110. The charge data for the call is generated to have a predetermined format and size based on the details of the call at the CGU 110 and transmitted to the CRU 130 of the AS 20.

And the transmitted charge data are assembled into a data block of a predetermined size (e.g., 1 Kbyte) at the CRU 130 to be recorded on the DKU 140 on a block-by-block basis. The data block includes a block header, a predetermined number of charge data and a checksum value. The recorded data blocks are transferred to the MTU 150 periodically with a predetermined time period or when the transfer of the charge data is requested.

A call billing for a subscriber is done based on the charge data stored at the MTU 150 and predetermined billing rates. It may occur that the subscriber argues his/her call billing. As the arguing subscriber requests charge data verifying process for his/her call, the subscriber is registered on the CGU 110 for charge data verification and then the charge data for the registered subscriber is transmitted from the CGU 110 to the CVU 160. The CVU 160 verifies the transmitted charge data, e.g., displays it on display and records it on the DB 170. And the charge data stored in the MTU 150 is analyzed to check whether or not there is any erroneous charge data.

However, in such an ESS 1, the CVU 160 is capable of verifying only the charge data whose verification is requested after the registration for the verification process. And also an error in the charge data is detected only after the charge data on the MTU 150 is analyzed. Consequently, it is desirable to analyze the charge data automatically (i.e., simultaneously with transferring the charge data from DKU 140 to the MTU 150) and use the analysis result to start the verification process or send an error message to an operator.

Hitherto, no prior art ESS is known to have such analyzing capabilities.

SUMMARY OF THE INVENTION

It is, therefore, a primary object of the present invention to provide an electronic switching system for analyzing charge data automatically.

It is another object of the present invention to provide a method, for use in an electronic switching system, for analyzing charge data automatically.

In accordance with one aspect of the present invention, there is provided an electronic switching system for analyzing charge data automatically, comprising:

generator for generating the charge data for a call;

recorder coupled with the generator for receiving the charge data from the generator and assembling a data block having a block header, a plurality of charge data and checksum value;

first memory for storing a multiplicity of the data blocks;

analyzer coupled with the first memory for checking the charge data of the data block to detect any erroneous charge data and search for a long call;

controller coupled with the analyzer for generating and transmitting a predetermined message for erroneous charge data to an operator and determining to verify the charge data for a subscriber of the long call;

verifier coupled with the generator for receiving from the generator and displaying the charge data; and second memory coupled with the verifier for storing the verified charge data.

In accordance with another aspect of the present invention, there is provided a method, for use in an electronic switching system, for analyzing charge data automatically, comprising the steps of:

(a) receiving and storing the charge data in a data block format, the data block including a block header, a plurality of charge data and a checksum value;

(b) checking whether or not the data block is normal;

(c) checking whether or not the billing time is normal;

(d) checking whether or not the call is a long call; and (e) checking whether or not predetermined contents of the charge data are normal.

BRIEF DESCRIPTION OF THE DRAWING

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
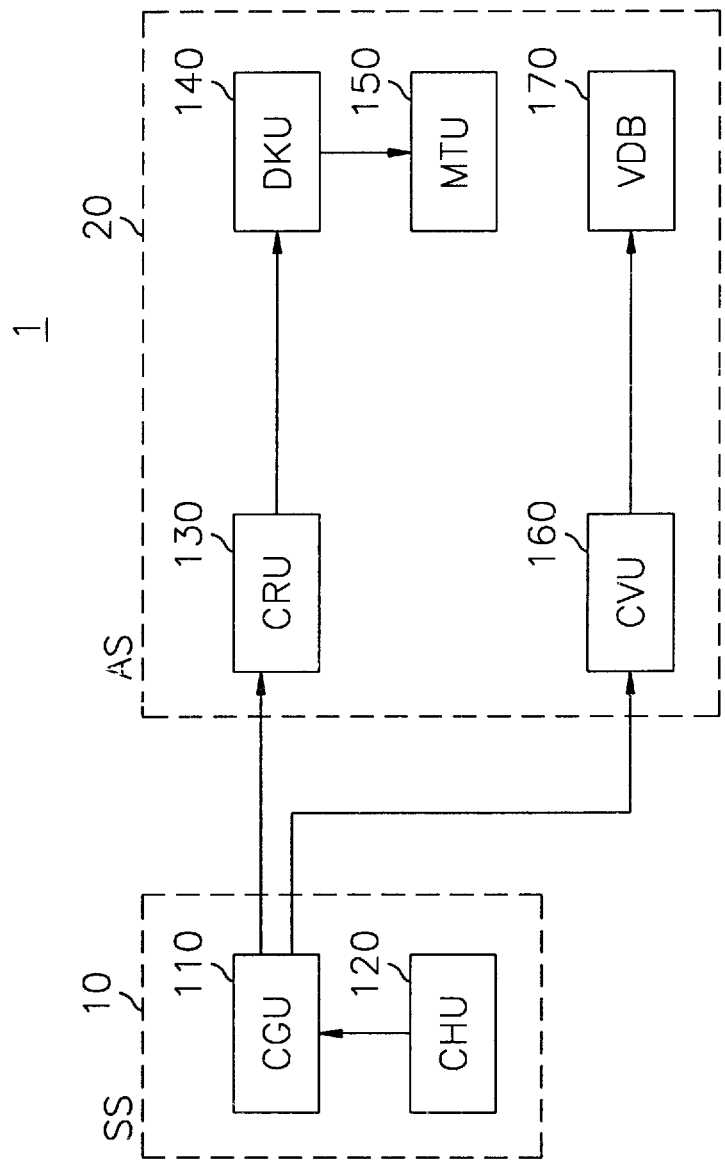
FIG. 1 shows a block diagram of an ESS of the prior art.
Figure 2:
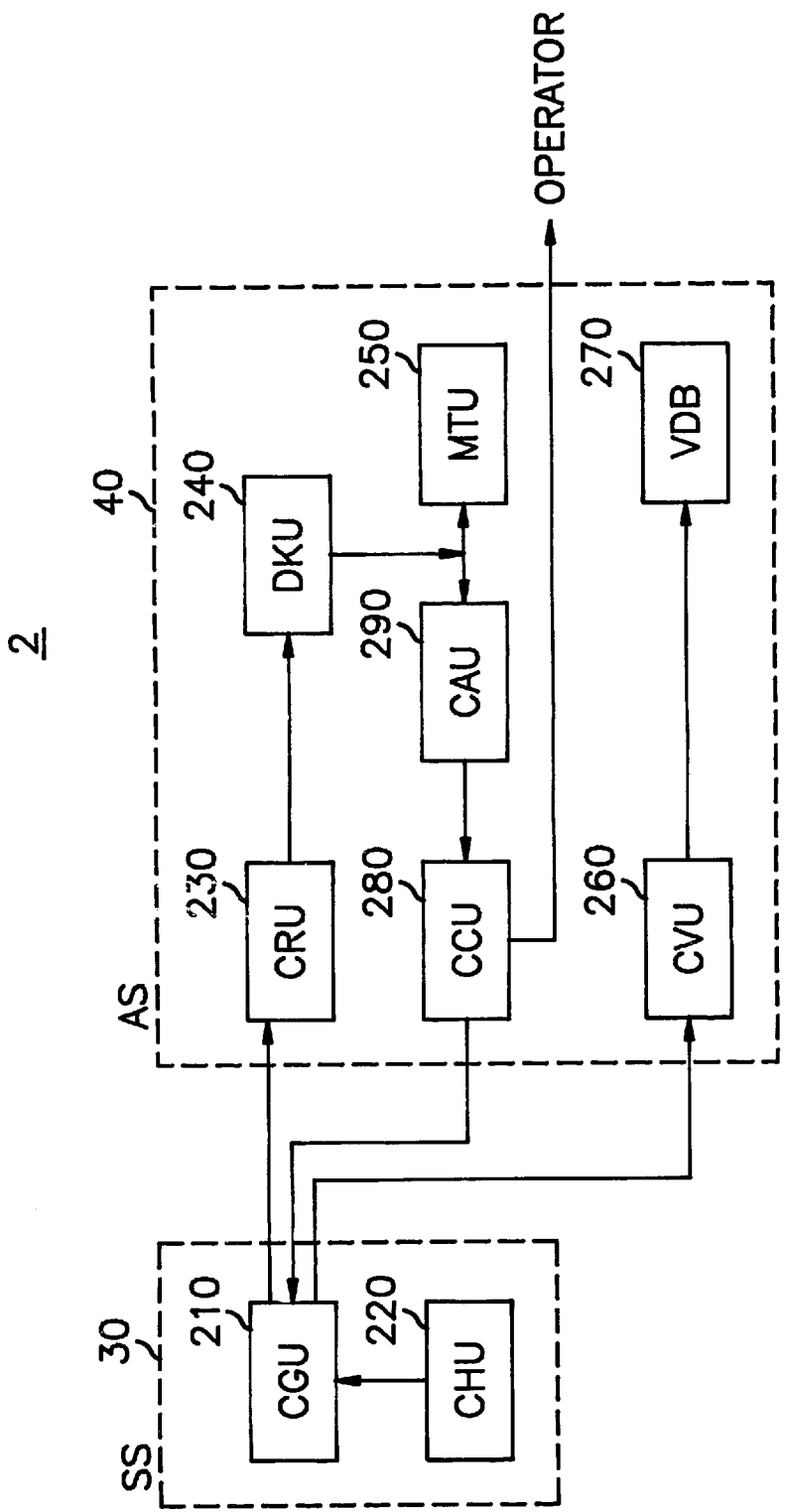
FIG. 2 provides a block diagram of an ESS of the present invention.

Referring to FIG. 2, there is provided a block diagram of an embodiment of an electronic switching system (ESS) 2 in accordance with the present invention, capable of analyzing charge data automatically. The ESS 2 comprises a multiplicity of switching subsystems (SS's) 30 and an administration subsystem (AS) 40.

In FIG. 2, for the sake of illustration, it is offered only one SS 30 in the ESS 2. The SS 30 includes a call handling unit (CHU) 220 and a charge data generating unit (CGU) 210 to communicate information between two selected subscribers and generate charge data. The AS 40 coupled with the SS 30 controls all the operations and maintenance functions of the ESS 2, such as administering the charge data and the like. The AS 40 includes a charge data recording unit (CRU) 230, a disk unit (DKU) 240, a magnetic tape unit (MTU) 250, a charge data verifying unit (CVU) 260, a verification database (VDB) 270, a charge data verification controlling unit (CCU) 280 and a charge data analyzing unit (CAU) 290.

When a call is terminated, predetermined details of the call, such as a type of call, a type of subscriber, a charge class, a source number, a destination number, a calling start time and a calling end time, are transferred from the CHU 220 to the CGU 210. The charge data for the call is generated to have a predetermined format and size based on the details of the call at the CGU 210 and transmitted to the CRU 230 of the AS 40.

And the transmitted charge data are assembled into a data block of a predetermined size at the CRU 230 to be recorded on the DKU 240 on a block-by-block basis. The data block includes a block header, a predetermined number of charge data and a checksum value. The recorded data blocks are transferred to the MTU 250 periodically with a predetermined time period or when the transfer of the charge data is requested.

In the present invention, the data blocks are transferred to the MTU 250 to be stored and also to the CAU 290 to be analyzed. In the CAU 290, it is checked whether or not there is any erroneous charge data and the call is a long call, i.e., the billing time is longer than a predetermined time.

Figure 3:
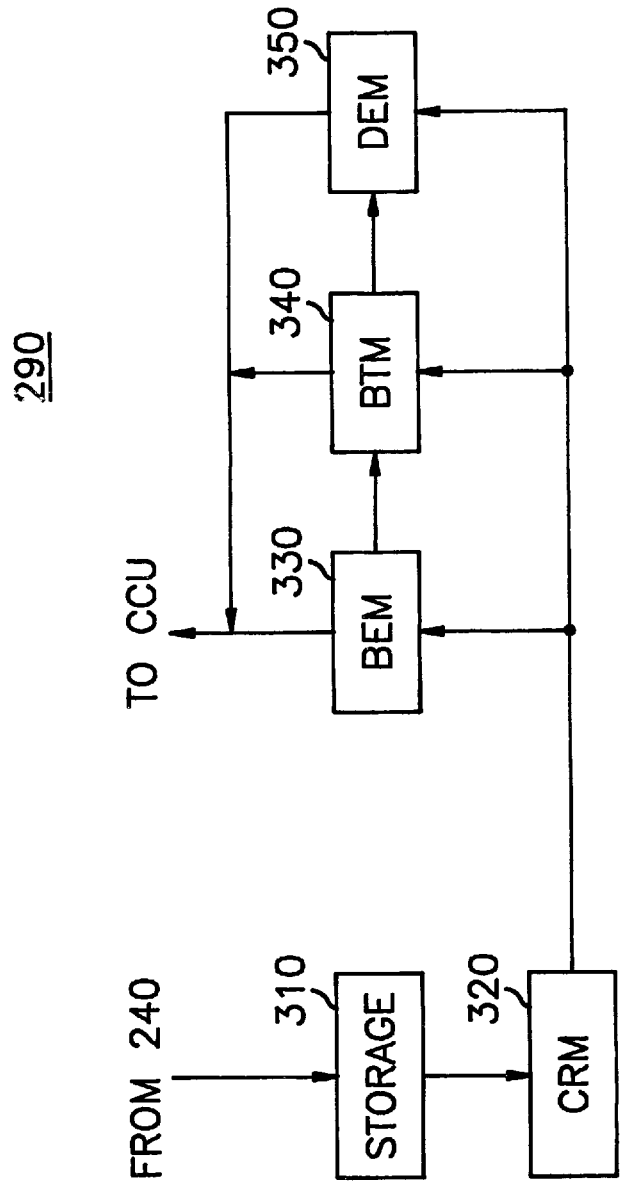
FIG. 3 offers a schematic diagram of a charge data analyzing unit of the inventive ESS.

Referring to FIG. 3, there is provided a schematic block diagram of the CAU 290 of the inventive ESS 2. The CAU 290 includes a storage 310, a storage retrieving module (SRM) 320, a block error checking module (BEM) 330, a billing tire checking module (BTM) 340 and a data error checking module (DEM) 350.

For the sake of illustration, it is assumed that 60 data blocks are transferred to CAU 290 at a time, wherein each data block is of a size of 1 Kbyte. And each data block includes 28 charge data of 36 byte size. The transferred data blocks are stored on the storage 310. The 1 Kbyte data block is retrieved by the SRM 320 and is provided to the BEM 330, the BTM 340 and the DEM 350.

In the BEM 330, a checksum value is extracted from the 1 Kbyte data block and stored at temporal storage (not shown) (CSV-S). And a checksum value is calculated based on the contents of the data block (CSV-C). And then the CSV-C is compared with the CSV-S. If the two checksum values are not identical, a block error signal and the corresponding location in the storage 310 for the data block, are transmitted to the CCU 280.

And, if otherwise, the 1 Kbyte data block transferred from the SRM 320 is divided into 28 charge data of 36 byte size in the BTM 340. Each resultant charge data includes the details of the call, such as the type of the call, the type of the subscriber, the charge class, the source subscriber number, the destination subscriber number, the calling start time and the calling end time, for the corresponding call.

Upon divided, the calling start time and the calling end time are extracted from the charge data in the BTM 340. And the result of the substraction the calling start time from the calling end time (i.e., billing time for the call) is checked whether or not it is positive. If the billing time is not positive, a billing time error signal and the corresponding charge data are transmitted to the CCU 280.

And, if otherwise, the billing time is compared with a predetermined period, e.g., 3 hours, to check whether or not the call is a long call in the 340. If the billing time is longer than 3 hours (i.e., the call is the long call), the long call signal and the corresponding charge data are transmitted to the CCU 280.

And, if otherwise, the predetermined set of subscriber information included in the charge data is extracted and stored at a temporal storage (not shown) (SI-S) and the predetermined subscriber information of a subscriber database (not shown) of the ESS is retrieved (SI-R) in the DEM 350. And the SI-S is compared with the SI-R. For example, it is checked whether or not the type of the call of the charge data is what is allowed to the subscriber. If the contents of the subscriber information are not identical, the data error detection signal and the corresponding charge data is transmitted to the CCU 280.

Returning the FIG. 2, receiving the analysis result from the CAU 290, the CCU performs its functions as follows.

When the block error signal and the corresponding location on the storage 310 for the data block are received at the CCU 280, a block error message including the location of the data block is generated by the CCU 280. And the block error message is provided to the operator to take action for the data block error.

When the billing time error signal and the corresponding charge data are received at the CCU 280, a billing time error message including the charge data is generated by the CCU 280. And the billing time error message is provided to the operator to take action for the billing time error.

When the long call signal and the corresponding charge data are received at the CCU 280, it is check whether or not the number of the long calls for the subscriber during a predetermined period reaches a predetermined number.

If the number reaches the predetermined number, the subscriber is registered on the subscriber database (not shown) of the ESS for the charge data verification. After the registration, charge data for the subscriber is transmitted to the CVU 260 from the CGU 210. Transmitted charge data is verified, e.g., recorded on the VDB 270 and displayed, by the CVU 260.

The present invention is capable of analyzing charge data automatically. And the analysis result is sent to the operator of the ESS to take action when an error is detected during the process of the CAU 290. And also charge data verification process may be started more actively. Consequently, in the inventive ESS, the probability of erroneous charge billing may decrease.

While the present invention has been shown and described with respect to the particular embodiments, it will he apparent to those skilled in the art that many changes and modifications may be made without departing from the spirit and scope of the invention as defined in the appended claims.

What is claimed is:

1. An electronic switching system for analyzing charge data automatically, comprising:

means for generating the charge data for a call;

recording means coupled with said generating means for receiving the charge data from said generating means and assembling a data block having a block header, a plurality of charge data and checksum value;

first memory means for storing a multiplicity of the data blocks;

analyzing means coupled with said first memory means for checking the charge data of the data block to detect any erroneous charge data and search for a long call;

controlling means coupled with said analyzing means for generating and transmitting a predetermined message for erroneous charge data to an operator and determining to verify the charge data for a subscriber of the long call;

verifying means coupled with said generating means for receiving from said generating means and displaying the charge data; and second memory means coupled with said verifying means for storing the verified charge data.

2. The system of claim 1, wherein said analyzing means includes third memory means coupled with said first memory means for storing a multiplicity of data blocks;

retrieving means coupled with said third memory means for buffering the data block from the multiplicity of data blocks;

first checking means coupled with said retrieving means and said controlling means for checking whether or not the retrieved data block is erroneous;

second checking means coupled with said first checking means, said retrieving means and said controlling means to check whether or not the call is a long call; and third checking means coupled with said second checking means, said retrieving means and said controlling means for checking whether or not predetermined contents of the charge data is erroneous.

3. The system of claim 2, wherein said first checking means is means for comparing a checksum value extracted from the data block with a checksum value calculated using data of the data block.

4. The system of claim 2, said second checking means is means for checking the order of a calling start time and a calling end time of the charge data and comparing a billing time with a predetermined time, the billing time being a result of the substraction the calling start time from the calling end time.

5. A method, for use in an electronic switching system, for analyzing charge data automatically, comprising the steps of:

(a) receiving and storing the charge data in a data block format, the data block including a block header, a plurality of charge data and a checksum value;

(b) checking whether or not the data block is normal;

(c) checking whether or not the billing time is normal;

(d) checking whether or not the call is a long call; and (e) checking whether or not predetermined contents of the charge data are normal.

6. The method of claim 5, wherein said step (b) includes steps of:

(b1) extracting a checksum value from the data block;

(b2) calculating a checksum value of the data block;

(b3) comparing the extracted checksum value with the calculated checksum value; and (b4) if the extracted checksum value is identical to the calculated checksum value, dividing the data block into a predetermined number of predetermined size call records; and, if otherwise, transmitting a block error message to an operator and repeating the steps (a), (b1), (b2) and (b3).

7. The method of claim 6, wherein said step (c) includes steps of:

(c1) extracting a calling start time and a calling end time from the call record;

(c2) checking whether or not the result of the substraction the calling start time from the calling end time is positive; and (c3) if the result of the substraction of the step (g) is positive, subtracting a predetermined time from said substraction result; and, if otherwise, transmitting time error message to the operator and repeating the steps (a), (b), (c1), (c2).

8. The method of claim 7, wherein the step (d) includes steps of:

(d1) checking whether or not the substraction result of said step (c3) is positive; and (d2) if it is positive, checking the number of long calls for a corresponding subscriber during a predetermined period to determine to verify the charge data for the subscriber; and, if otherwise, extracting predetermined contents of the charge data.

9. The method of claim 8, wherein the step (e) includes steps of:

(e1) comparing the extracted contents with the subscriber information stored in the electronic switching system; and (e2) if the extracted subscriber information is identical to the stored subscriber information, repeating the steps (a), (b), (c), (d) and (e1); and, if otherwise, transmitting subscriber information error message to the operator.

* * * * *